United States Patent Office 2,883,394
Patented Apr. 21, 1959

2,883,394
NEW INDOLE DERIVATIVES

Walter Schindler, Riehen, near Basel, Switzerland, assignor to Geigy Chemical Corporation, New York, N.Y., a corporation of Delaware No Drawing. Application April 18, 1957
Serial No. 653,531

Claims priority, application Switzerland May 5, 1956

3 Claims. (Cl. 260—319)

The present invention is concerned with a new indole derivative, 2-(β-amino-ethyl)-5-hydroxy indole of the formula:

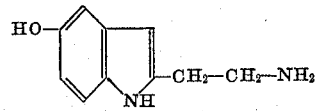

which in the following will be called isoserotonin and which has valuable pharmacological properties. The invention also concerns the double salt thereof with one mol of creatinine, one mol of sulphuric acid and one mol of water which crystallises well, as well as a process for the production of this substance. This process is characterised by reducing a 5-benzyloxy indole-2-carboxylic acid dialkylamide with an alkali metal-earth metal hydride to form a 2-dialkylaminomethyl-5-benzyloxy indole, quaternising this with a low molecular alkyl halide or dialkyl sulphate, reacting the 2-trialkylammoniomethyl-5-benzyloxy indole halide or alkyl sulphate obtained with an alkali metal cyanide, hydrogenating the 5-benzyloxy indolyl-(2)-acetonitrile to the 2-(β-amino-ethyl)-5-benzyloxy indole or, advantageously, reducing it with an alkali metal-earth metal hydride and converting the amino compound by hydrogenolysis with catalytically activated hydrogen, possibly in the same step, into the isoserotonin. From the latter, mineral acid salts are produced if desired, or, by adding sulphuric acid, creatinine and water and allowing to crystallise in a water soluble organic solvent, the double salt of the isoserotonin with one mol of each of the three further components mentioned above is produced.

The dimethylamide produced for example by reacting the acid chloride with dimethylamine can be used as 5-benzyloxy indole-2-carboxylic acid dialkylamide and it is reduced advantageously with lithium aluminium hydride. By quaternising the 5-benzyloxy-isogramine with methyl iodide the iodide of 2-trimethylammoniomethyl-5-benzyloxy indole is obtained which can be reacted for example with potassium or sodium cyanide. The 5-benzyloxy-indolyl-(2)-acetonitrile so obtained is reduced advantageously again with lithium aluminium hydride. The amino compound is hydrogenolytically split for example by using the free 2-(β-amino-ethyl)-5-benzyloxy indole in alcoholic solution, treating it with hydrogen at room temperature and atmospheric pressure in the presence of palladium charcoal and then converting the crude isoserotonin so obtained into its hydrochloride by adding hydrogen chloride.

However, also the acid sulphate of the 2-(β-amino-ethyl)-5-benzyloxy indole obtained on the reduction can be hydrogenolysed in an analogous manner. In this case, on filtering off the catalyst and evaporating the ethanolic solution, the crude acid sulphate of the isosertonin remains, from which, for example by adding creatinine and excess water, heating, adding ethanol and allowing to crystallise under ice cooling, the double salt referred to above is obtained.

The following example further illustrates the performance of the process according to the present invention. The temperatures are given in degrees centigrade.

Example (a) 5-benzyloxy indole carboxylic acid (M.P. 192–194°) can be produced for example according to W. R. Böhme (Am. Soc. 75 2502 (1953)). 24.0 g. of this acid are suspended in 600 ccm. of abs. benzene and 25 ccm. of the most pure thionyl chloride are added. The whole is refluxed for 2 hours while strongly introducing nitrogen and then half the benzene is distilled off. The residue is cooled with ice and then benzolic dimethylamine solution is added in portions until there is a constant alkaline reaction to litmus paper. It is kept for half an hour in ice and then 100 ccm. of water are added in order to extract the desired dimethylamine hydrochloride from the precipitated mixture of the desired dimethylamide and dimethylamine hydrochloride. The dimethylamide which remains is filtered under suction, washed with water and dried. After crystallising from abs. alcohol, 5-benzyloxy indole-2-carboxylic acid dimethylamide is obtained which melts at 198–200°.

The benzolic/aqueous filtrate is separated, the benzene solution is washed with water, dried and concentrated to a small volume whereupon a further amount of the same substance is obtained.

(b) 2.0 g. of lithium aluminium hydride are dissolved in 110 ccm. of abs. tetrahydrofurane. A solution of 5.0 g. of 5-benzyloxy indole-2-carboxylic acid dimethylamide in 150 ccm. of tetrahydrofurane is added dropwise while stirring well. After the dropwise addition, the whole is kept for 6 hours at 40° and, after cooling in ice, it is decomposed first with a little ethyl acetate and water. The water-containing tetrahydrofurane solution is concentrated in the vacuum and the residue is taken up in ether. The ether solution is extracted four times with 20 ccm. of 2 N-acetic acid each time, the acid extracts are made alkaline with 4 N-caustic soda lye and the precipitated amine is taken up in ether. It is dried over sodium sulphate and concentrated to a small volume in the vacuum. After the addition of pentane, the 2-dimethylaminomethyl-5-benzyloxy indole crystallises out; M.P. 80°.

(c) 5.0 g. of the above substance are dissolved warm in 15 ccm. of ethyl acetate and 2.5 g. of methyl iodide are added. The quaternary salt soon begins to separate out, and after boiling for half an hour it is completely separated out. The mixture is cooled, the precipitated iodide of 2-trimethyl-ammoniomethyl-5-benzyloxy indole is filtered off under suction and washed with a little ethyl acetate and some abs. ether; M.P. 178–179°.

(d) 18 g. of the metho-iodide obtained above and 18 g. of finely pulverised potassium cyanide are suspended in 540 ccm. of methanol and, while strongly introducing hydrogen, the whole is refluxed for 15 hours. The volume is concentrated to about 50 ccm. and 100 ccm. of water are added whereupon the precipitate is filtered off under suction. After drying, it is recrystallised from methanol whereupon 5-benzyloxy-indolyl-(2)-acetonitrile is obtained which melts at 180–181°.

(e) 1.0 g. of the above nitrile is placed in a Soxhlet container and 1.0 g. of LiAlH₄ in 200 ccm. of ether are refluxed for 24 hours in the flask of the Soxhlet apparatus. All the substance has dissolved out of the container after this time. It is cooled with ice and the excess LiAlH₄ solution is decomposed, first with ethyl acetate and then with water. After adding 20 ccm. of 2 N-caustic soda lye, the etheral solution is separated, the aqueous phase is again extracted with ether and the combined ether solutions are washed with water and then dried over potassium carbonate. The ether is distilled off and 2-(β-amino-ethyl)-5-benzyloxy indole is obtained as residue. M.P. 150–151°.

(f) 1.16 g. of the above named compound are dissolved in 75 ccm. of abs. alcohol and hydrogenated in the presence of 0.95 g. of palladium charcoal 10% at room temperature until the calculated amount of hydrogen has been taken up. After filtering off the catalyst under suction the alcohol is concentrated to half the volume in the vacuum and abs. alcoholic hydrochloric acid is added until the reaction is weakly acid to Congo red paper. Abs. ether is then added until the solution begins to go cloudy whereupon the product is crystallised in the refrigerator. The hydrochloride of the isoserotonin, (2-(β-amino-ethyl)-5-hydroxy indole), which crystallises out is filtered off under suction. Recrystallised from a mixture of abs. alcohol/ether, it melts at 190–192°.

According to another method of performing the hydrogenolysis, 300 mg. of the compound obtained according to e are dissolved in 25 ccm. of abs. alcohol and 115 mg.=0.06 ccm. of the purest concentrated sulphuric acid are added while cooling. Hydrogenation is performed in the presence of 250 mg. of 10% palladium charcoal until the calculated amount of hydrogen has been taken up. The catalyst is filtered off under suction and the solvent is evaporated off in the vacuum. The residue is dissolved in 3 ccm. of water, 100 mg. of creatinine are added at 60° and the whole is heated for 10 minutes at 60°. 100 ccm. of abs. alcohol are added and the solution is put into the refrigerator to crystallise. After 12 hours, the crystals are drawn off under suction and washed with abs. alcohol and ether. They are purified by recrystallising from 300 times the amount of 96% alcohol; M.P. 180–186°. The yield is 260 mg.

The isoserotonin according to the present invention has valuable neurophysiological properties. It is an antimetabolite of serotonin and, after parenteral, e.g. intravenous, application, it influences the blood pressure. Aqueous solutions of the mineral acid salts or of the double salts above mentioned for example can be injected.

What I claim is:

1. A member selected from the group consisting of 2-(β-amino-ethyl)-5-hydroxy-indole of the formula:

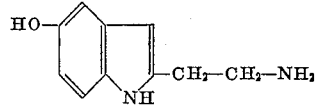

and its salt with one mol of creatinine, one mol of sulphuric acid and one mol of water.

2. 2-(β-amino-ethyl)-5-hydroxy-indole of the formula:

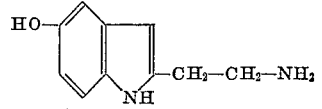

3. The salt of 2-(β-amino-ethyl)-5-hydroxy-indole with one mol of creatinine, one mol of sulphuric acid and one mol of water.

References Cited in the file of this patent

Woolley: A Study of Antimetabolites, New York, John Wiley and Sons Inc., page 227.

Kornfeld: Journal of Organic Chem., vol. 16, May 1951, page 806 et seq.